Figure 1:
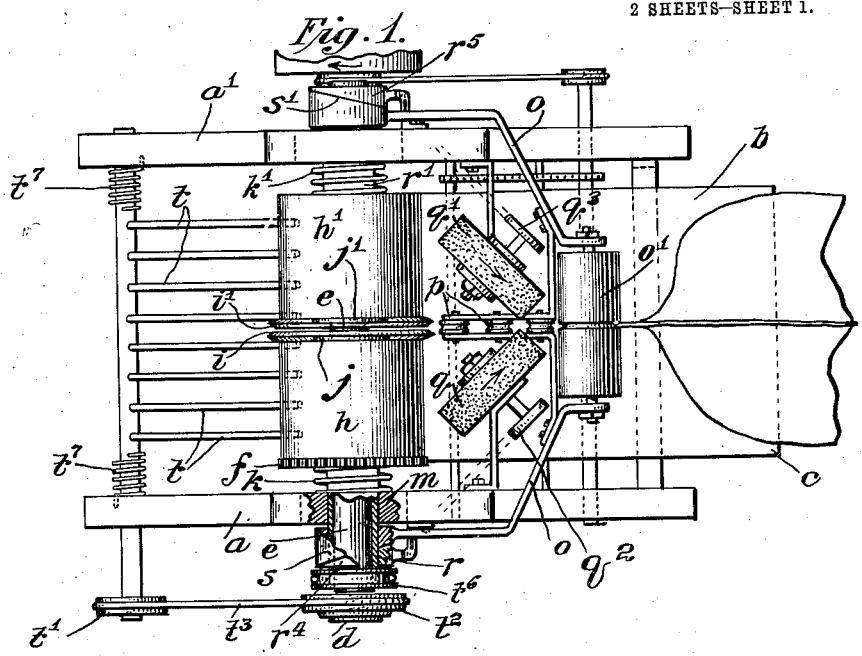

H. P. HILL.
TOBACCO WORKING MACHINE.
APPLICATION FILED JUNE 17, 1912.

1,082,519.

Patented Dec. 30, 1913.

2 SHEETS—SHEET 1.

Attest:
Mitchell
R. Richardson.

Halbert Paul Hill Inventor:
by Frank P. Wentworth
his Atty.

H. P. HILL.
TOBACCO WORKING MACHINE.
APPLICATION FILED JUNE 17, 1912.
1,082,519.
Patented Dec. 30, 1913.
2 SHEETS—SHEET 2.
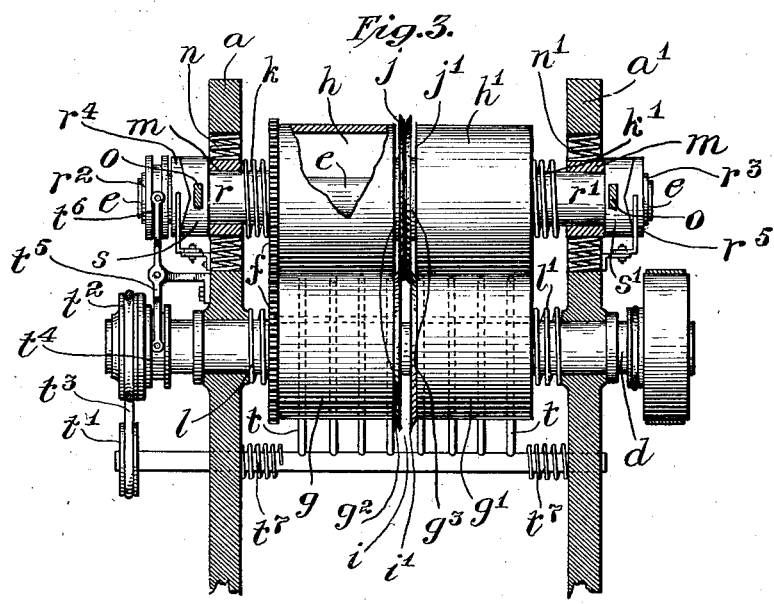
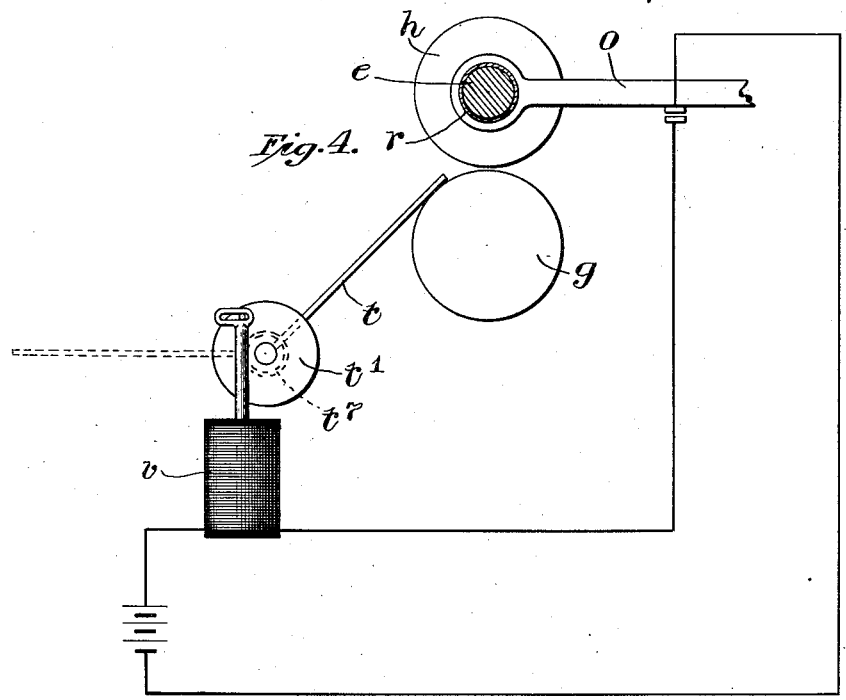

UNITED STATES PATENT OFFICE.

HALBERT PAUL HILL, OF NEW YORK, N. Y.

TOBACCO-WORKING MACHINE.

1,082,519.   Specification of Letters Patent.   Patented Dec. 30, 1913.

Application filed June 17, 1912. Serial No. 704,025.

*To all whom it may concern:*

Be it known that I, HALBERT PAUL HILL, a citizen of the United States, residing at the borough of Manhattan, in the city, county, and State of New York, have invented certain new and useful Improvements in Tobacco-Working Machines, of which the following is a specification, reference being had therein to the accompanying drawings, which form a part thereof.

My invention relates to tobacco working machines, and more particularly to a type thereof adapted to spread, stem and book the leaves.

The main object of the invention is to provide a machine of this character wherein the knives for stripping the stem will automatically adjust themselves, proportionately to the size of the stem, to adapt the machine for use with leaves of different sizes and avoid undue waste of the leaf-blade adjacent to the stem, which would occur were the knives to cut adjacent to the stem along fixed lines.

A further object is to provide a machine of this character which will remove the stem from the leaf and separate the stem and the blade in a manner to permit the booking of the latter, and to avoid the clogging of the machine by the former.

A still further object is to provide a machine wherein the two parts of the stripped leaf after the removal of the stem will be automatically booked in a manner not to interfere with the continued operation of the machine.

A still further object is to provide a machine of this character wherein automatic adjustment of the knives will be accomplished through the leaf about to be stemmed, thus insuring accuracy in the operation of the machine.

A still further object is to provide a machine of this character wherein each leaf as it passes to the cutting knives will be automatically smoothed in a manner to prepare it for the booking operation, which smoothing will be accomplished without likelihood of a tearing of the leaf blades.

A still further object is to provide a machine wherein the booking mechanism will be automatically actuated in synchronism with the knives in a manner to cause the delivery of each pair of blades at the instant when the blades have left the control of the knives, so as to avoid any likelihood of the mutilation of the blade while being transferred from the knives to the shelf. And a still further object is to provide a machine of this character wherein the knives will automatically adjust themselves to leaves of different sizes, so as to require merely the feeding of the leaves to the machine in a certain position, thus eliminating the necessity for the employment of skilled labor in the operation of the machine, while avoiding that waste usually incidental to the employment of unskilled labor.

The invention consists primarily in a tobacco working machine of the character herein described embodying therein oppositely disposed knives, means whereby said knives are adapted to have movement toward and from each other, and means controlled by the stem of the leaf for automatically adjusting said knives toward and away from each other whereby they are caused to cut close to the stem at every point of the leaf; and in such other novel features of construction and combination of parts as are hereinafter set forth and described, and more particularly pointed out in the claims hereto appended.

Figure 2:
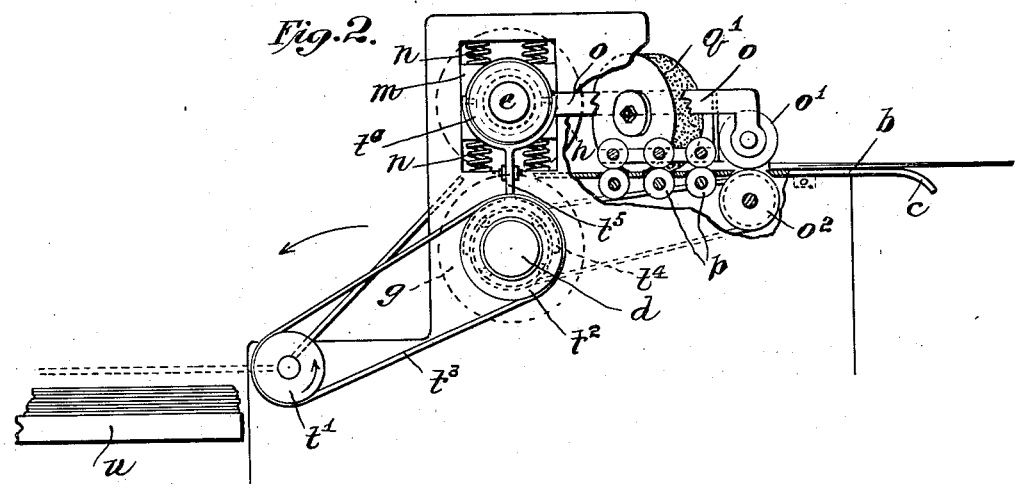

Referring to the drawings:—Figure 1 is a plan view of a machine embodying my invention; Fig. 2 is a side elevation thereof partly broken away; Fig. 3 is a front elevation of the knives and the means automatically adjusting same; and Fig. 4 is a detail view of the delivery or booking mechanism.

Like letters refer to like parts throughout the several views.

In the embodiment of my invention shown in the drawings, $a\ a'$ indicate the side frames of the machine, having a feeding table $b$ provided with a curved portion $c$ at the feeding end thereof. Mounted in the side frames $a\ a'$ is a power driven shaft $d$ and a parallel shaft $e$ driven therefrom by means of gear wheels $f$. Splined upon the shaft $d$ so as to be capable of movement laterally of the machine, are the feeding drums $g\ g'$, adapted to coöperate with similar drums $h\ h'$ splined to have movement upon the shaft $e$ in unison with the drums $g\ g'$. The function of these drums is to hold the leaf flat while the knives are separating the stem therefrom, while at the same time feeding the leaf in synchronism with the movement of the knives and delivering the blades to the collecting mechanism.

The adjacent ends of the drums $h\ h'$ are reduced at $g^2$ and $g^3$ as shown more particularly in Fig. 3 of the drawings, and mounted upon the face of each reduced portion is a circular knife $j$ $j'$, this knife being spaced away from the operative face of the drum by means of said reduced portions $g^2$ $g^3$.

Coöperating with the knives $j$ $j'$ are knives $i$ $i'$ carried by the drums $g$ $g'$ respectively, the edges of these knives entering a channel between the knives $j$ $j'$ and the drums $h$ $h'$ formed by the reduced portions $g^2$ $g^3$ of the said drums. The knives $i$ $i'$ have a close sliding fit in this channel so as to transmit the lateral movement of one set of drums to the oppositely disposed drums.

The drums $h$ $h'$ are normally forced toward each other by the springs $k$ $k'$ of light tension, while the drums $g$ $g'$ are similarly forced toward each other by similar springs $l$ $l'$.

To secure the desired yielding contact between the drums $g$ $g'$ and $h$ $h'$, one pair of these drums (as $g$ $g'$) is mounted in bearings $m$ which are spring supported as by the springs $n$ $n'$ in a manner to permit these drums to be automatically separated to permit the passage of the leaf therebetween.

While in the drawings I have shown the use of two pairs of oppositely disposed feeding rollers, carrying circular knives, I do not intend to limit myself to the use of two pairs of rollers, as it is apparent that merely one set of circular knives is necessary to accomplish the cutting, and other means may be substituted for the lower rollers $g$ $g'$.

The springs $k$ $k'$ normally force the rollers $h$ $h'$ and their knives $j$ $j'$ toward each other so as to bring these knives into a position where they will be fairly close together, the normal minimum distance between these knives being determined in assembling the machine, a condition made necessary by the means for automatically shifting the knives to cause them to follow the stem when being acted upon thereby.

Pivotally mounted upon the shaft $e$ are the lever arms $o$, in the free end of which is mounted a feed roller $o'$ disposed between the drums $g$ $g'$ $h$ $h'$ and the operator, the arms $o$ being adapted to bring this roller $o'$ into engagement with a power driven roller $o^2$ the upper periphery of which is on substantially the level of the table $b$.

Arranged between the feed rollers $o'$ and $o^2$ and the said drums, is a plurality of pairs of oppositely disposed feeding rollers $p$, carried by and adapted to have movement with the arms $o$, and adapted to engage the stem of the leaf, straighten it, and carry it toward said drums while holding the arms $o$ elevated until the leaf has almost entirely passed to said drums.

Disposed between the feed rollers $o'$ and $o^2$ and said drums, is a plurality of smoothing and straightening devices $q$ $q'$, preferably consisting of rotary power driven flexible brushes, the axes of which are set obliquely to the center line of the machine, so as to cause the contact of these brushes with the leaf to have the twofold function of smoothing out the leaf and advancing it toward the drums $h$ $h'$, $g$ $g'$. The obliquity of the rotary brushes $q$ $q'$ being outwardly of the longitudinal center of the machine, and forwardly, thus serves to straighten the leaf by a force applied in the direction of movement of the leaf, and minimizes the tendency of these brushes to tear the leaves in any way. Said brushes are driven from the pulleys $q^2$ $q^3$. Carried by the shaft $e$ and attached to the drum $h$ $h'$ respectively, are sleeves $r$ $r'$ carrying bearings $r^2$ $r^3$ adjacent to which is a non-rotary cam block $r^4$ $r^5$ loosely mounted on the said sleeves respectively. Carried by the arms of the levers $o$ are cam members $s$ $s'$ adapted to engage the cams $r^4$ $r^5$ and impart lateral movement to the drums $h$ $h'$ as determined by the movement of the feed roller $o$, said drums having a normal tendency to move toward each other under the springs $k$ $k'$ $l$ $l'$. This construction constitutes means controlled by the leaf itself whereby the knives will be automatically shifted laterally to accommodate themselves to stems of different widths or varying widths in the same stem. The knives, therefore, under the control of the leaf itself are caused to open and close to closely follow the stem and thus remove the stem from the leaf in a manner approximating hand work without that loss incidental to the tearing of the leaf by the operators. With high grade, imported tobacco the saving effected is material.

Beyond the drums $g$ $g'$ $h$ $h'$ is a table $u$ adapted to receive the two half blades of each leaf, or upon which said half blades are adapted to be booked and delivered. Adjacent to said table is an oscillatory frame $t$ adapted to be intermittently actuated during the interval between the discharge of one leaf from said drums, and the initiation of the feeding movement of the succeeding leaf. To insure the timely actuation of this frame $t$, I provide its shaft with a pulley $t'$ passing about which and a roller $t^2$ idly mounted upon the shaft $d$, is a belt or equivalent driving mechanism $t^3$. This driving mechanism is adapted to be coupled to said shaft $d$ by means of a friction clutch $t^4$ controlled by an oscillatory lever $t^5$ actuated from a grooved pulley $t^6$ upon the sleeve $r$. The frame $t$ is restored to the receiving position by the torsion spring $t^7$.

In the modification shown in Fig. 4 of the drawings, I have shown the pulley as actuated by means of a solenoid $v$, the circuit to which is closed through the same movement of the drum $h$ as is adapted to actuate the lever $t^5$, thus insuring the timely actuation of the said frame $t$.

The operation of the herein described machine is substantially as follows:—In running the machine, the operator feeds the leaf butt first to the rollers $o'$ $o^2$. As each leaf passes between these rollers, the roller $o'$ and the upper roller of each pair of rollers $p$ is raised, carrying with it the lever arm $o$, which turns the cam members $s$ $s'$ about the shaft $e$. This movement of the levers $s$ $s'$ forces the slidable cam blocks $r^4$ $r^5$ away from the center line of the machine, thus separating the drums $g$ $g'$ $h$ $h'$ and their knives $i$ $i''$ $j$ $j'$, to an extent determined by the quantity of movement of the arms $o$. As the stem leaves the rollers $o'$ $o^2$, it passes between the rollers $p$, which maintain the elevation of the arms $o$ and hold the knives open until the body of the leaf has passed between same. As the leaves pass along the table $b$, the brushes $q$ $q'$ remove any folds or wrinkles therefrom, while at the same time aiding in the feeding movement of the leaves to a limited extent. As the butt end of the leaf passes between the knives $i$ $i'$ $j$ $j'$, the leaf blade upon opposite sides of the stem is cut close to the stem, and with the continued traverse of the leaf under the drums $g$ $g'$ $h$ $h'$, and the rollers $o'$ $o^2$ and $p$, as the size of the stem becomes smaller it permits the lever arms $o$ to gradually descend in proportion to the decrease in the width of the stem, thus restoring the cam members $s$ $s'$ to their normal position and permitting the drums $g$ $g$ $h$ $h'$ with their knives to gradually close upon the stem under the springs $k$ $k'$ $l$ $l'$ so as to have the cut closely follow the stem and thus avoid waste of the leaf. During this operation the spring $t^7$ holds the frame $t$ in contact with the drums $g$ $g'$ so that as the separated sides of the leaf pass from these drums, they are received by this frame preparatory to being transferred to the table $u$ upon which the leaves are booked. As the tip of the leaf leaves the rollers $p$, and passes between the knives $i$ $i''$ $j$ $j'$, the drums $g$ $g'$ are restored to normal, at which instant the friction clutch $t^4$ is set through the lever $t^5$, thus oscillating the frame $t$ and depositing the two sides of the leaf upon the table $u$. The friction clutch $t^4$ in addition to actuating the frame $t$ has the function of permitting said frame to accommodate itself to books of different thicknesses, the resistance encountered by the frame $t$ from the book being sufficient to overcome the friction developed by this clutch, so as to permit slipping when occasion demands. Immediately upon the initial raising of the arms $o$, the said clutch is released and the frame $t$ under its spring $t^7$ is restored to normal preparatory to receiving the next leaf.

In the modification shown in Fig. 4 of the drawings, the operation is substantially the same as heretofore described, excepting that as the roller $o'$ descends it closes the circuit to the solenoid $v$, thus causing the timely reciprocation of this frame in transferring the sides of the leaf to the table $u$ for booking.

An apparatus such as is herein shown and described has the advantages of separating the two sides of the blade close to the stem by reason of the automatic shifting of the knives, thus avoiding waste; of removing the two sides of each leaf from the feeding drums and knives immediately after the leaf has been stemmed; and of permitting the stem to drop directly from the knives in a manner to eliminate any possibility of said stems clogging the machine in any way. Furthermore, as the leaf is fed to the stemming knives, it is smoothed out so as to prevent the creasing of the leaf by the feeding drums, while preparing it for automatic booking by means of the hand booking mechanism.

By using the oscillatory means controlling the lateral movement of the stemming knives, these knives are caused to adjust themselves to stems of any thickness or length. This adjustment is automatic, and is accomplished by that leaf passing through the machine at any time. The guide rollers $p$ permit the leaves to be fed to the machine at a point removed from the knives so as to avoid likelihood of injury to the operator, while at the same time holding the adjustment accomplished by means of the main feeding rollers until practically the entire leaf has passed beneath the feeding drums.

Owing to the delicate nature of the articles handled by the machine, all of the springs must be adjusted to very light tension, and the shifting mechanism for the knives must be so constructed and arranged as to operate with the expenditure of very little energy.

Machines made in accordance with my invention may be run at fairly high speed, and with the exception of the manual feeding of the leaves to the main feeding rolls, its operation is automatic throughout. Owing to the absence of likelihood of the stems clogging the machine, and the removal of each leaf after it has been stemmed, the duration of the run of this machine is unlimited.

It is not my intention to limit the invention to the precise details of construction shown in the accompanying drawings, it being apparent that such may be varied without departing from the spirit and scope of the invention.

I believe it to be broadly new to provide in a machine of this character knives which are automatically adjustable laterally so as to closely hug the stem, and I intend to claim such broadly.

Having described my invention, what I claim as new and desire to have protected by Letters Patent, is:—

1. A tobacco working machine of the character herein described embodying therein oppositely disposed knives, means whereby said knives are adapted to have movement toward and from each other, and means acting upon said last named means and controlled by the stem of the leaf for automatically adjusting said knives toward and away from each other whereby they are caused to cut close to the stem at every point of the leaf.

2. A tobacco working machine of the character herein described embodying therein stemming knives adapted to operate upon opposite sides of the stem, said knives being adapted to have movement toward and away from each other, feeding means for delivering leaves to said knives, means adapted to engage the stem of a leaf and operative connections between said last named means and said knives whereby said means are adapted to impart variable movement to said knives in proportion to the dimensions of said stem.

3. A tobacco working machine of the character herein described embodying therein oppositely disposed knives, feeding drums adapted to engage the leaf adjacent to said knives, means whereby said knives are adapted to have movement toward and from each other, and means acting upon said last named means and controlled by the stem of the leaf for automatically adjusting said knives toward and away from each other whereby they are caused to cut close to the stem at every point of the leaf.

4. A tobacco working machine of the character herein described embodying therein stemming knives adapted to operate upon opposite sides of the stem, feeding drums adapted to engage the leaf adjacent to said knives, said knives being adapted to have movement toward and from each other, feeding means for delivering leaves to said knives, means adapted to engage the stem of a leaf and operative connections between said last named means and said knives whereby said means are adapted to impart variable movement to said knives in proportion to the dimensions of said stem.

5. A tobacco working machine of the character herein described embodying therein a pair of oppositely disposed stemming knives, drums adjacent thereto, means coöperating with said knives, means coöperating with said drums, said knives, said drums and said means coöperating therewith respectively being adapted to have lateral movement toward and from each other, and means controlled by the stem of the leaf for automatically moving said knives and said drums and their coöperating parts toward and from each other to an extent determined by the size of the stem of a leaf.

6. A tobacco working machine of the character herein described embodying therein a pair of oppositely disposed stemming knives, drums adjacent thereto, means coöperating with said knives, means coöperating with said drums, said knives, said drums and said means coöperating therewith respectively being adapted to have lateral movement toward and from each other, means controlled by the stem of a leaf for automatically moving said knives and said drums and their coöperating parts toward and from each other to an extent determined by the size of the stem of a leaf, and flexible supports for said drums and said knives whereby said drums will automatically adjust themselves to the stems of leaves of different thickness.

7. A tobacco working machine of the character herein described embodying therein a pair of oppositely disposed stemming knives, drums adjacent thereto, means coöperating with said knives, means coöperating with said drums, said knives, said drums, and said means coöperating therewith respectively being adapted to have lateral movement toward and from each other, feeding means adapted to engage a leaf and advance it toward said knives, and means actuated thereby whereby said drums, said knives, and their coöperating means respectively will be automatically shifted laterally to cause them to follow the stem of the leaf.

8. A tobacco working machine of the character herein described embodying therein stemming knives adapted to operate upon opposite sides of the stem, said knives being adapted to have movement toward and away from each other, springs normally forcing said knives toward each other, feeding means for delivering leaves to said knives, and means controlled by said feeding means and adapted to separate said knives against the tension of said springs.

9. A tobacco working machine of the character herein described embodying therein a pair of oppositely disposed, circular stemming knives, rotary drums adjacent thereto, coöperating circular knives below said first named knives, coöperating rotary drums below and engaging said first named rotary drums, said drums and said knives being adapted to have simultaneous lateral movement, and means controlled by the stem of the leaf for automatically imparting movement to said knives toward and away from each other whereby they are forced to cut close to the stem at every point of the leaf.

10. A tobacco working machine of the character herein described, embodying therein stemming knives adapted to operate upon opposite sides of the stem, said knives being adapted to have movement toward and away from each other, feeding means for delivering leaves to said knives comprising a roller mounted in vertically movable arms, coöperating means carried by said arms and said knives whereby the movement of said arms will automatically force said knives toward and away from each other.

11. A tobacco working machine of the character herein described, embodying therein stemming knives adapted to operate upon opposite sides of the stem of a leaf, said knives being adapted to have movement toward and away from each other, feeding means for delivering leaves to said knives comprising a roller mounted in vertically movable arms, said arms having pivotal movement about the shaft adjacent to said knives, coöperating cam surfaces carried by said arms and said knives whereby the movement of said arms will automatically force said knives away from each other, and means normally forcing said knives toward each other.

12. A tobacco working machine of the character herein described, embodying therein stemming knives adapted to operate upon opposite sides of the stem of a leaf, said knives being adapted to have movement toward and away from each other, feeding means for delivering leaves to said knives comprising a roller mounted in vertically movable arms, a pair of supplemental feeding rollers adjacent to said knives, one of said rollers being carried by and movable with said arms, and said arms having pivotal movement about the shaft adjacent to said knives, coöperating cam surfaces carried by said arms and said knives whereby the movement of said arms will automatically force said knives away from each other, and means normally forcing said knives toward each other.

13. A tobacco working machine of the character herein described embodying therein stemming knives adapted to operate upon opposite sides of the stem of a leaf, said knives being adapted to have movement toward and away from each other, feeding means for delivering leaves to said knives, means adapted to engage the stem of a leaf and impart variable movement to said knives in proportion to the dimensions of said stems, and rotary brushes disposed between said last named means and said knives for straightening and smoothing the leaves prior to their delivery to said knives, said brushes being set obliquely of the line of traverse of the leaf, and rotating in a direction coincident with the traverse of the leaf and outwardly from the center of the machine.

14. A tobacco working machine of the character herein described, embodying therein oppositely disposed knives, means whereby said knives are adapted to have movement toward and away from each other, means controlled by the stem of the leaf for automatically adjusting said knives toward and away from each other whereby they are caused to cut close to the stem at every point of the leaf, a table adapted to receive the two sides of the stemmed leaf, and a transfer mechanism adapted to receive said sides of the leaf after leaving said knives, while permitting the removed stem to pass beneath said means.

15. A tobacco working machine of the character herein described, embodying therein oppositely disposed knives, means whereby said knives are adapted to have movement toward and away from each other, means controlled by the stem of the leaf for automatically adjusting said knives toward and away from each other whereby they are caused to cut close to the stem at every point of the leaf, a table adapted to receive the two sides of the stemmed leaf, and a transfer mechanism adapted to receive said sides of the leaf after leaving said knives, while permitting the removed stem to pass beneath said means, comprising an oscillatory frame pivotally mounted adjacent to said table and extending adjacent to said knives, and means for imparting a timely reciprocation to said frame.

16. A tobacco working machine of the character herein described embodying therein oppositely disposed, circular, rotary knives, means whereby said knives are adapted to have movement toward and away from each other, means controlled by the stem of the leaf for automatically adjusting said knives toward and away from each other whereby they are caused to cut close to the stem at every point of the leaf, a table adapted to receive the two sides of the stemmed leaf, and a transfer mechanism adapted to receive said sides of the leaf after leaving said knives while permitting the removed stem to pass beneath said means, comprising an oscillatory frame pivotally mounted adjacent to said table and extending adjacent to said knives, a friction device adapted to be set by said knives when they are moved toward each other, and connections between said friction device and said shaft for said frame whereby a timely reciprocation is imparted to said frame.

In witness whereof, I have hereunto affixed my signature, in the presence of two subscribing witnesses, this 13 day of June, 1912.

HALBERT PAUL HILL.

Witnesses:
A. M. HERITAGE,
STANLEY COLTER.